(No Model.)

W. L. URQUHART.
MECHANICAL TOY.

No. 563,896. Patented July 14, 1896.

WITNESS:

INVENTOR
William L. Urquhart
BY
Edgar Tate & Co
ATTORNEYS.

UNITED STATES PATENT OFFICE.

WILLIAM LEWIS URQUHART, OF OTTAWA, CANADA.

MECHANICAL TOY.

SPECIFICATION forming part of Letters Patent No. 563,896, dated July 14, 1896.

Application filed April 14, 1896. Serial No. 587,468. (No model.)

*To all whom it may concern:*

Be it known that I, WILLIAM LEWIS URQUHART, a subject of the Queen of England, and a resident of Ottawa, in the county of Carleton and Dominion of Canada, have invented certain new and useful Improvements in Mechanical Toys, of which the following is a specification, reference being had to the accompanying drawings, forming a part thereof, in which similar letters of reference indicate corresponding parts.

This invention relates to mechanical toys, and the object thereof is to provide an improved device of this class which is designed to interest and amuse children, and which comprises a wheel mounted in a yoke which is provided with a handle by which it is operated, said wheel being provided with a rim or tire which is connected therewith but separated therefrom by an annular space in which is mounted a bicycle or other vehicle which travels in said space and on which is placed a figure which represents a man.

The invention is fully disclosed in the following specification, of which the accompanying drawings form a part, in which—

Figure 1:
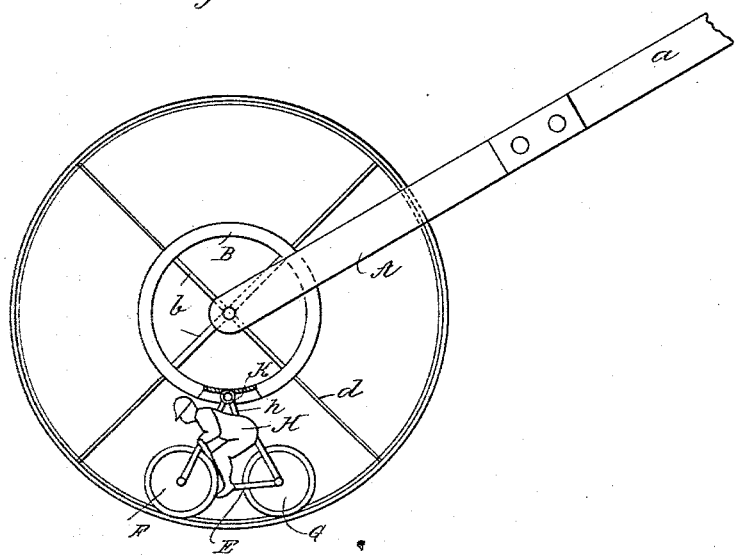
Figure 2:
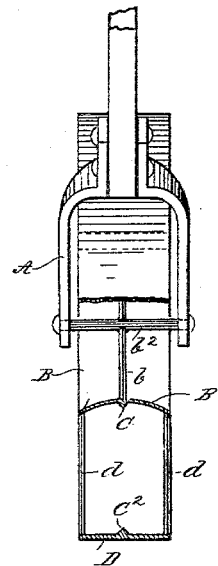

Figure 1 is a side view of my improved toy, and Fig. 2 a view thereof at right angles to Fig. 1 and showing a part of the construction in section.

In the practice of my invention I provide a yoke A, to which is secured a handle $a$, and mounted in the yoke A is a wheel B, which is provided with spokes $b$ and a central shaft $b^2$, which passes through the ends of the sides of the yoke.

The wheel B is of the form in cross-section shown in Fig. 2, and connected therewith is a supplemental tire or rim D, said wheel B and said supplemental tire or rim D being connected by said spokes $d$.

The wheel B is slightly curved in cross-section, the convex surface thereof being directed inwardly and formed on the outer surface, and centrally thereof is an annular bead or outwardly-directed annular projection C, and the supplemental tire or rim D is provided at its inner surface with an inwardly-directed annular bead or projection $C^2$, and mounted in the annular space between the wheel B and the supplemental tire or rim D is a bicycle E, which comprises the usual wheels F and G and the usual frame, and on said frame is placed a figure H, which represents a man or other bicyclist, and connected with said figure or with supports $h$, secured thereto, is a guide-wheel K, provided with an annular groove and which is adapted to travel on the outwardly-directed annular bead or projection C, and the wheels F and G of the bicycle are also provided with annular grooves and adapted to travel on the inwardly-directed annular bead or projection $C^2$.

The bicycle is held in position and adapted to travel in the annular space between the wheel B and the supplemental tire or rim D by means of the annular beads or projections C and $C^2$ and the guide-wheel K and the annular grooves in the wheels F and G of the bicycle, and as the wheel B and the supplemental tire or rim D, which is connected therewith by side spokes $d$, are revolved by means of the yoke A and the handle $a$ connected therewith, the bicycle travels around in the annular space between said wheel and said tire or rim, as hereinbefore described, the rapidity of the motion thereof depending upon the rapidity of the revolution of the wheel B.

This device is simple in construction and operation and also comparatively inexpensive, and it is evident that changes in and modifications of the construction herein described may be made without departing from the spirit of my invention or sacrificing its advantages.

Having fully described my invention, I claim as new and desire to secure by Letters Patent—

1. A mechanical toy, comprising a yoke, a wheel mounted therein, a supplemental tire or rim connected with said wheel and separated therefrom by an annular space and a bicycle mounted in said space and adapted to travel therein substantially as shown and described.

2. A mechanical toy, comprising a yoke, a wheel mounted therein, a supplemental tire or rim connected with said wheel and separated therefrom by an annular space and a bicycle mounted in said space and adapted to travel therein, the wheel of said bicycle being provided with annular grooves and adapted to travel on an annular bead or projection formed on said tire or rim, and the frame of the bicycle being provided with a wheel which is adapted to travel on a corresponding annular bead or projection on said wheel, substantially as shown and described.

3. A mechanical toy, comprising a yoke, a wheel mounted therein, a supplemental tire or rim connected with said wheel and separated therefrom by an annular space and a bicycle mounted in said space and adapted to travel therein, the wheel of said bicycle being provided with annular grooves, and adapted to travel on an annular bead or projection formed on said tire or rim, and the frame of the bicycle being provided with a wheel which is adapted to travel on a corresponding annular bead or projection on said wheel, and said bicycle being provided with a figure which represents a man or other bicyclist, substantially as shown and described.

In testimony that I claim the foregoing as my invention I have signed my name, in presence of the subscribing witnesses, this 10th day of April, 1896.

WILLIAM LEWIS URQUHART.

Witnesses:
A. HARVEY,
B. HARVEY.